May 23, 1944.   E. H. WIEDMANN   2,349,324
UNIVERSAL TOOL GRINDING MACHINE
Filed Nov. 10, 1941   8 Sheets-Sheet 1

Inventor
Ernest H. Wiedmann
By
Attorneys

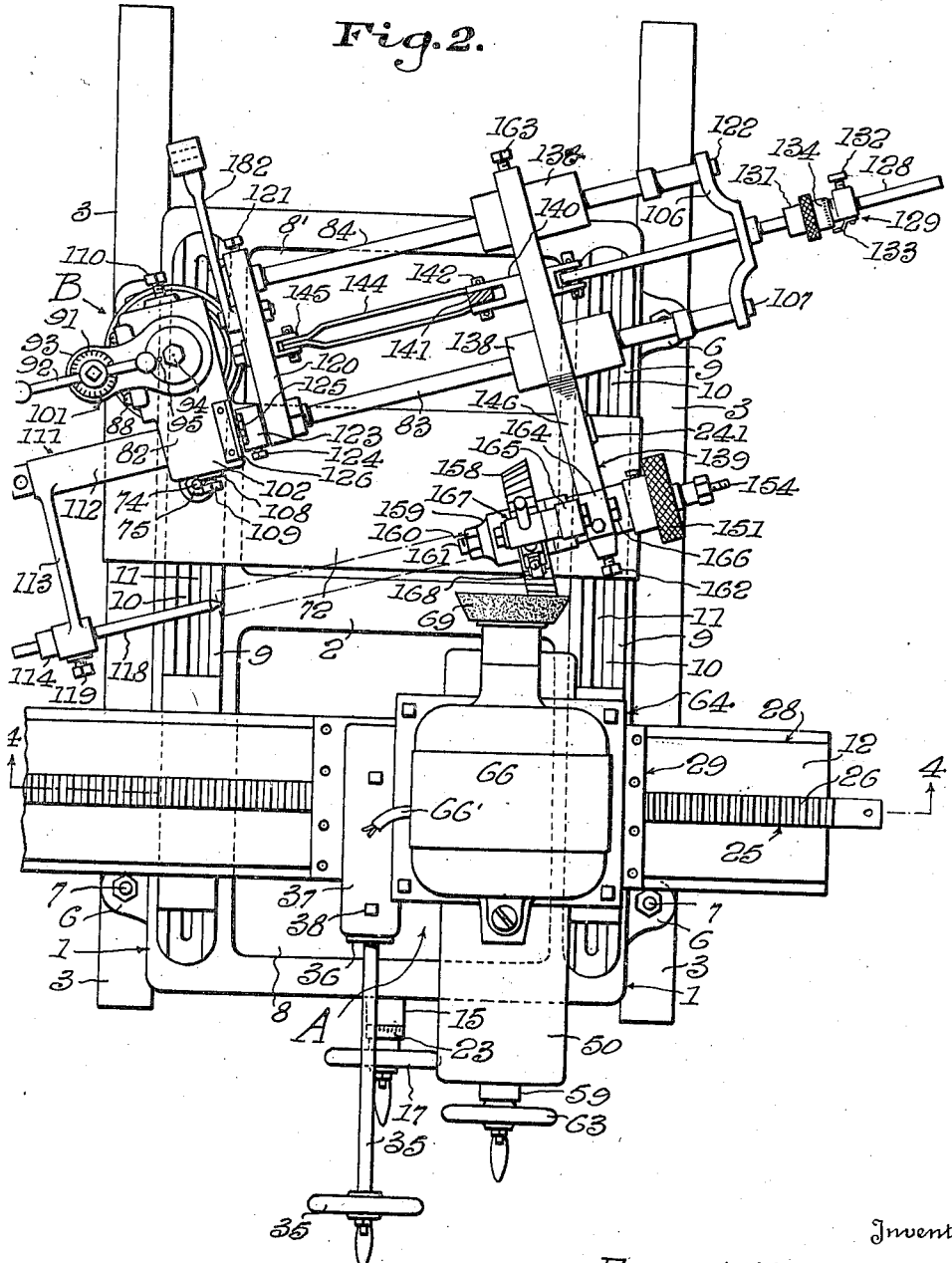

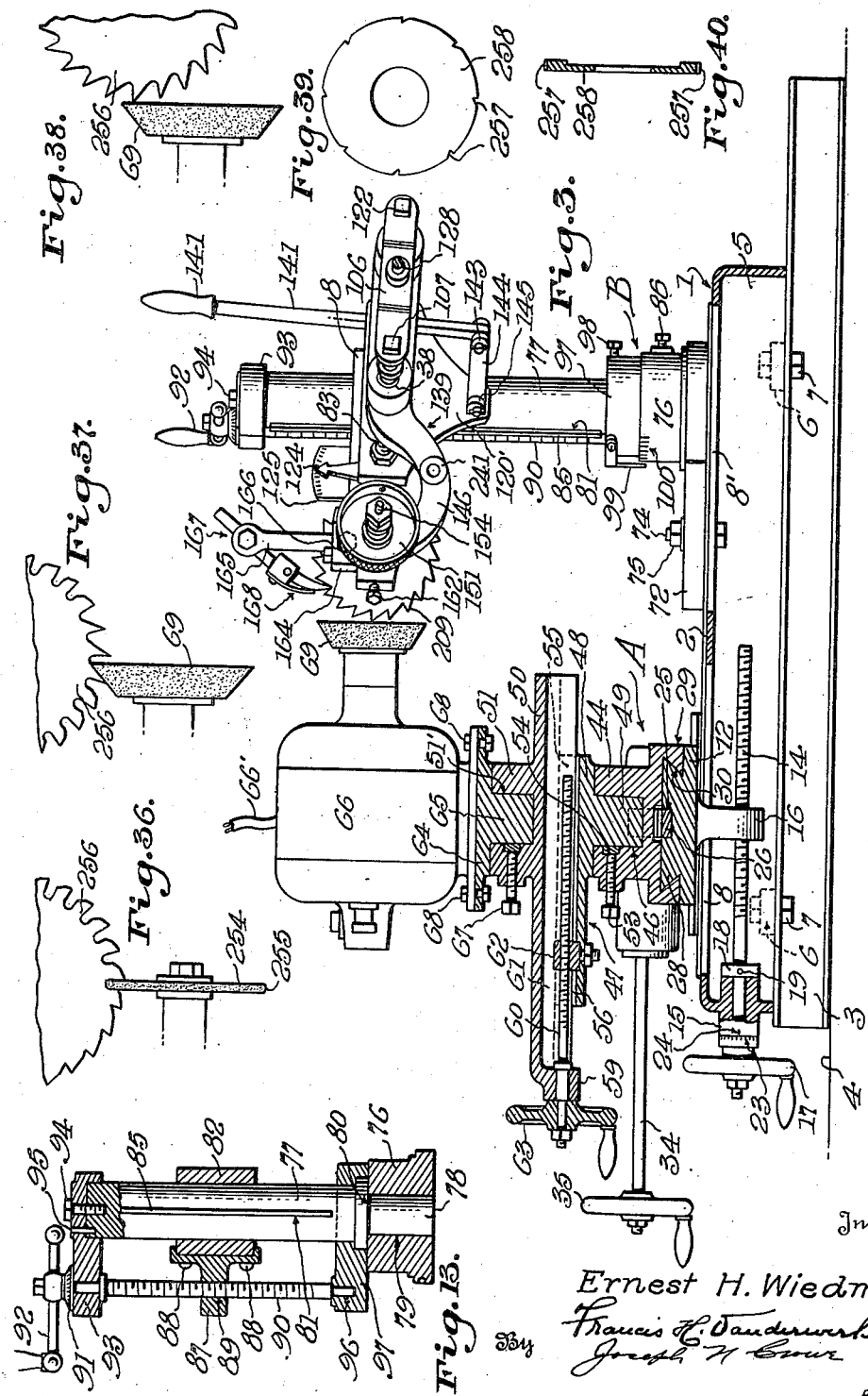

May 23, 1944.  E. H. WIEDMANN  2,349,324
UNIVERSAL TOOL GRINDING MACHINE
Filed Nov. 10, 1941  8 Sheets-Sheet 4
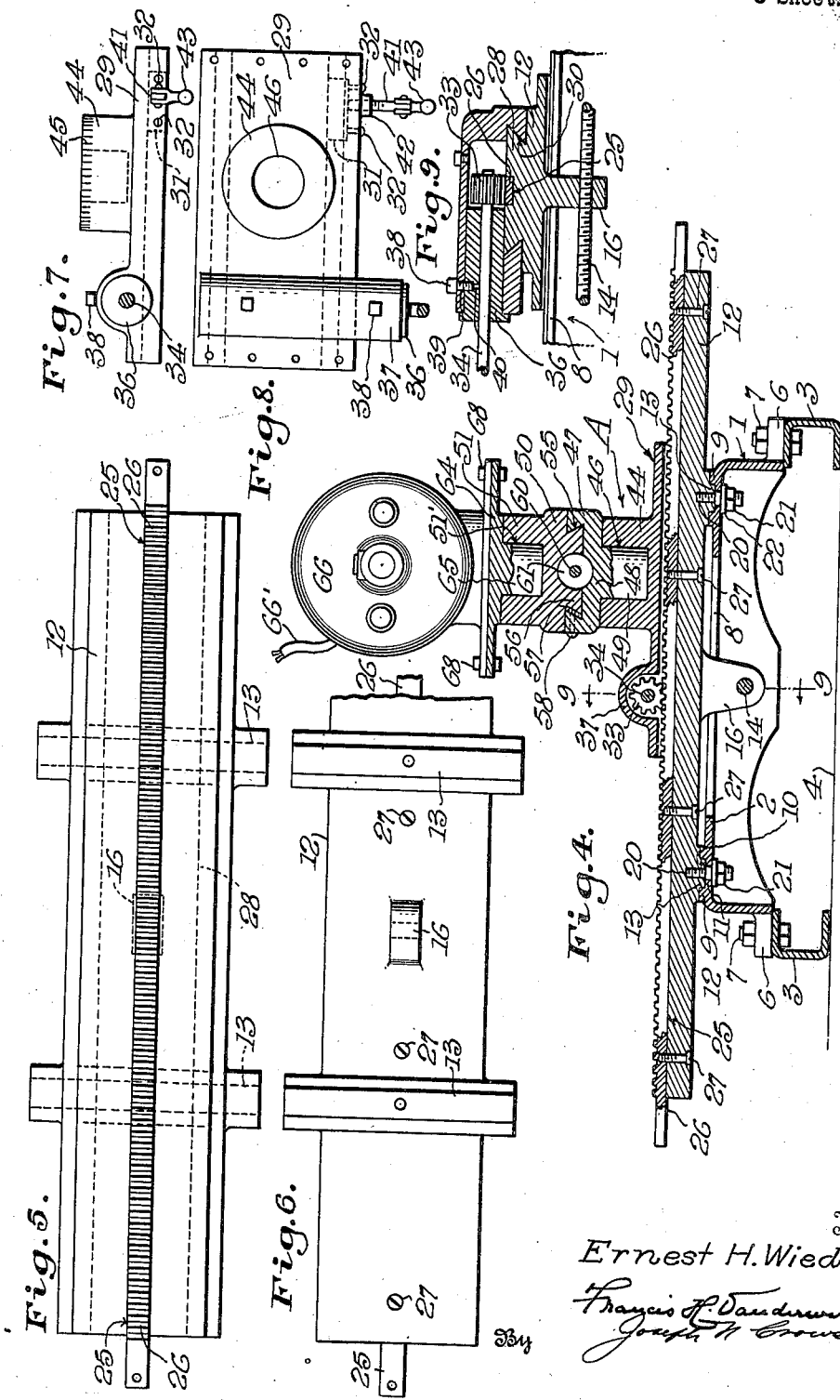
Inventor
Ernest H. Wiedmann
Attorneys

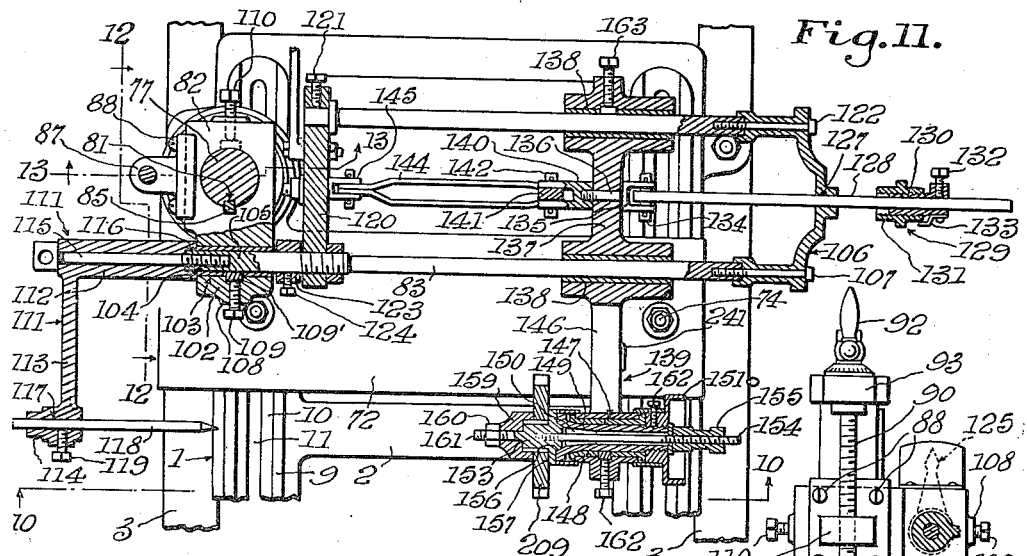
Fig. 11.
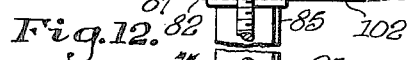
Fig. 12.
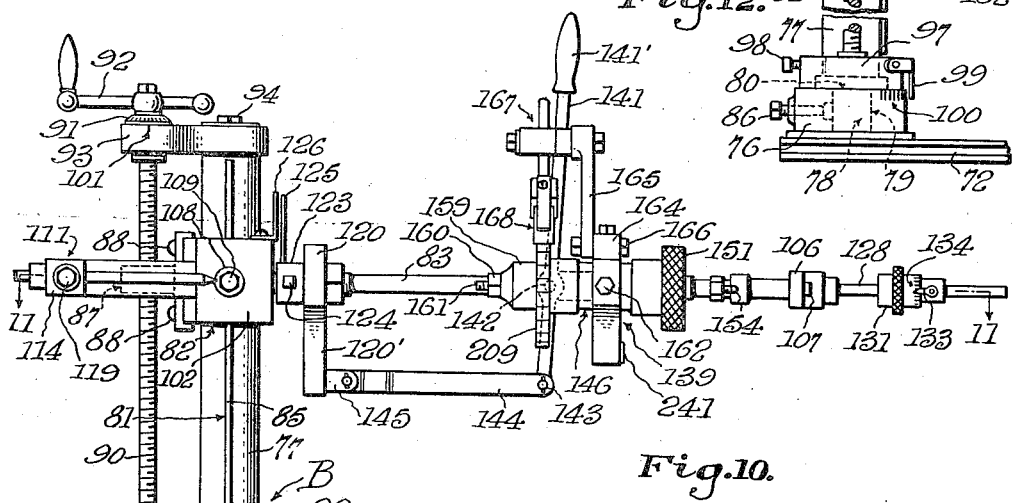
Fig. 10.
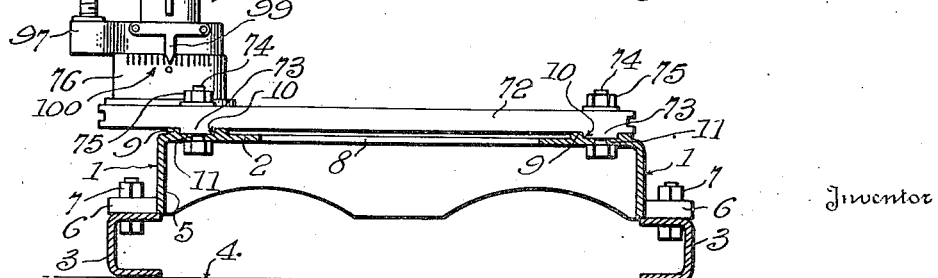

May 23, 1944.    E. H. WIEDMANN    2,349,324
UNIVERSAL TOOL GRINDING MACHINE
Filed Nov. 10, 1941    8 Sheets-Sheet 6
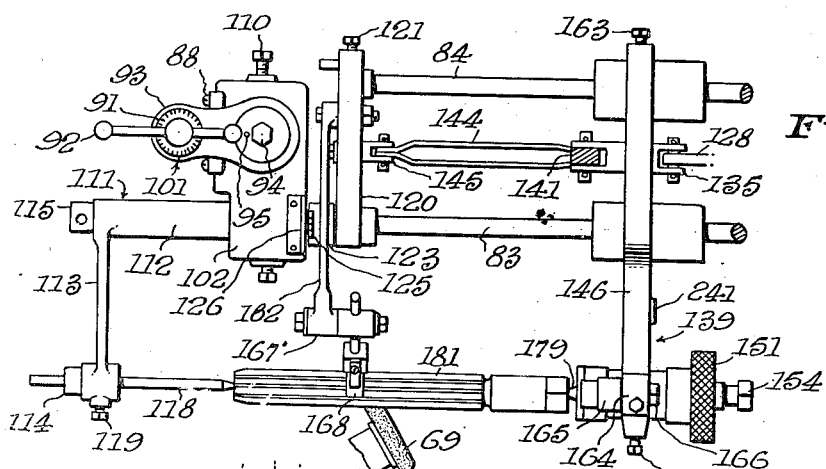
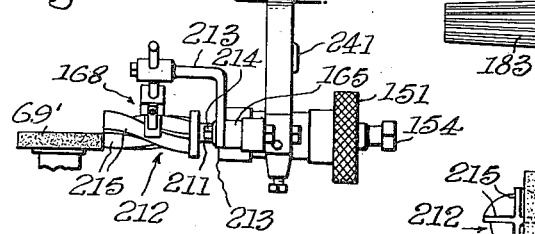
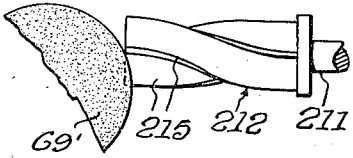
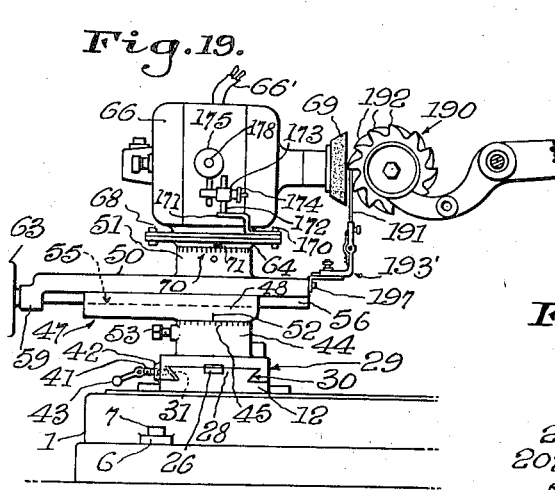
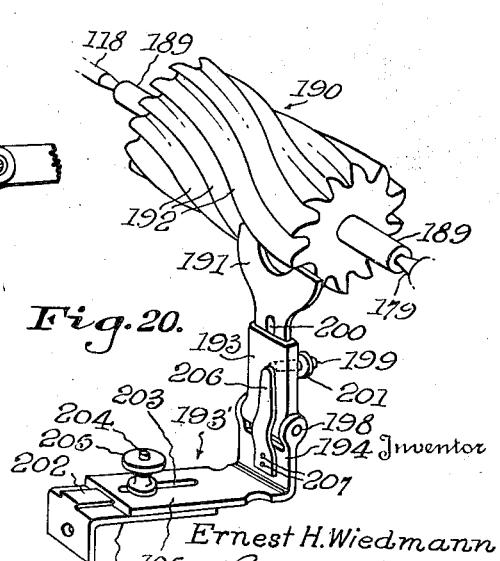
Ernest H. Wiedmann
Inventor May 23, 1944.　　　E. H. WIEDMANN　　　2,349,324
UNIVERSAL TOOL GRINDING MACHINE
Filed Nov. 10, 1941　　　8 Sheets-Sheet 7
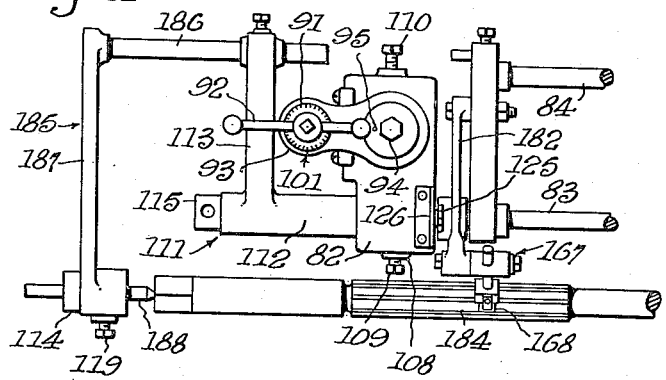
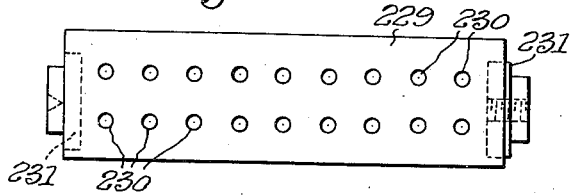
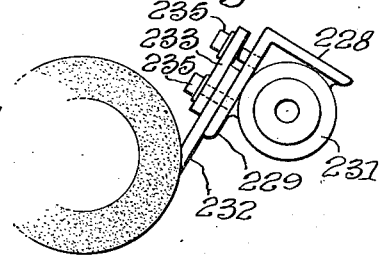
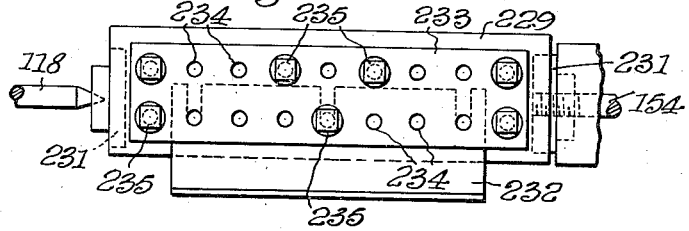
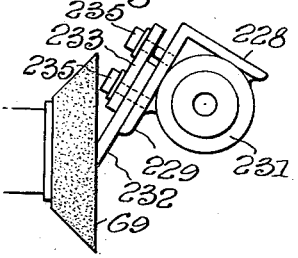
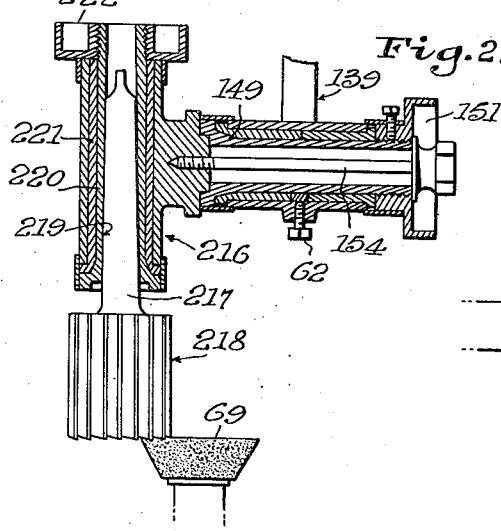
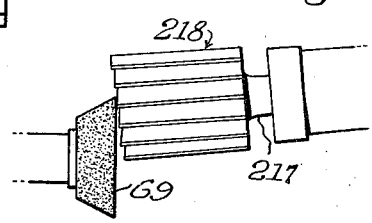
Inventor
Ernest H. Wiedmann

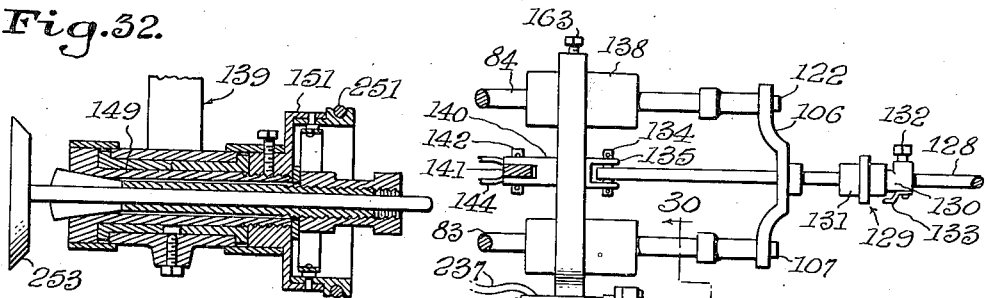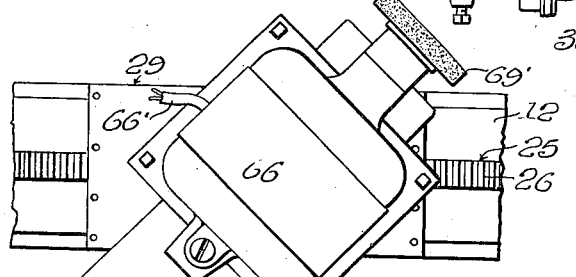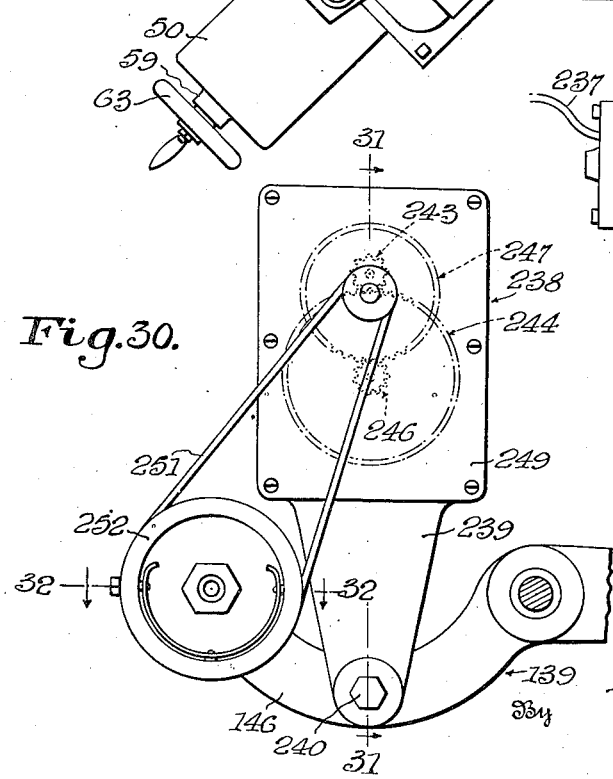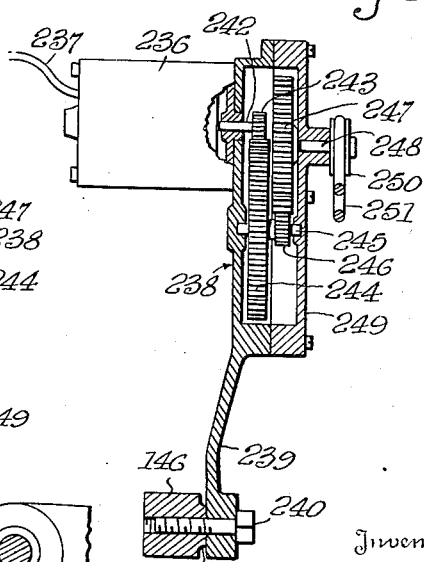

Patented May 23, 1944

2,349,324

UNITED STATES PATENT OFFICE 2,349,324

UNIVERSAL TOOL GRINDING MACHINE

Ernest Henry Wiedmann, San Diego, Calif.

Application November 10, 1941, Serial No. 418,498

19 Claims. (Cl. 51—34)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to grinding machines, more particularly it is directed to a universal grinding machine for grinding tools or the like.

The primary object of the invention is to provide a universal tool grinding machine which may be manufactured at a relatively low cost, which is simple and practical in operation, nonexcessive in weight or bulk, and which is sturdily built and capable of producing accurately ground work.

Another object of the invention is to provide a universal grinding machine, including various attachments for mounting different pieces of work to be ground, said attachments being of various types which are easily and quickly installed on the machine and universally adjustable whereby the different pieces of work may be easily ground.

Other objects of the invention are to provide a universal tool grinding machine in which a motor for operating a grinding wheel is revolvable in a complete circle and dynamically balanced, thereby affording a setting of the grinding wheel at any desired angle without interference with other adjustments and eliminating all vibration during a grinding operation upon different classes of work; also in which a wide scope of performances is available in a few simple movements, and a wide choice in feed and speed of operation of the grinding machine is had for performing different grinding operations.

With the above and other objects and advantages in view, the invention consists of certain features of construction and operation of parts which will hereinafter appear and in which—

Fig. 2 is an enlarged fragmentary top plan view of the improved universal grinding machine illustrated in an adjusted operated position and showing the use of a cup grinding wheel for grinding the teeth of a bevel milling cutter;

Fig. 3 is a side elevation partly in section of the universal grinding machine illustrated in Figs. 1 and 2;

Fig. 4 is a transverse sectional view partly in elevation of the grinding machine, taken on the line 4—4 of Fig. 2;

Fig. 5 is a top plan view of a platen having a feed rack mounted thereon, used in carrying out the invention;

Fig. 6 is a fragmentary bottom plan view thereof;

Fig. 7 is a side elevation of a grinding wheel motor carrier support;

Fig. 8 is a top plan view thereof;

Fig. 9 is a fragmentary vertical sectional view taken on the line 9—9 of Fig. 4;

Fig. 10 is a transverse sectional view taken on the line 10—10 of Fig. 11, and illustrating a straight toothed milling cutter in operative position to be ground on the tool holding portion of the machine;

Fig. 11 is a horizontal sectional view taken on the line 11—11 of Fig. 10;

Fig. 12 is a fragmentary vertical sectional view taken on the line 12—12 of Fig. 11;

Fig. 13 is a vertical sectional view partly in elevation taken on the line 13—13 of Fig. 11;

Fig. 14 is a fragmentary top plan view of a tool supporting portion of the grinding machine having a straight reamer mounted thereon and illustrating a grinding wheel engaging the outer end of the teeth of the reamer, with the reamer being yieldably held to rotate in one direction by a ratchet;

Fig. 15 is a side elevation of a tapered reamer;

Fig. 16 is a fragmentary view of part of the tool supporting portion of the grinding machine having a small spiral end mill mounted thereon held in position by a socket and illustrating the use of a straight edge grinding wheel in an operative position for grinding the outer cutting edges of the teeth of the spiral end mill;

Fig. 17 is a fragmentary end view of Fig. 16;

Fig. 18 is a fragmentary view of the grinding wheel and spiral end mill illustrated in Figs. 16 and 17 in an adjusted operative position for producing a clearance on the outer end of the spiral end mill;

Fig. 19 is a fragmentary side elevation of the grinding machine in an operative position for grinding the teeth of a spiral slab milling cutter;

Fig. 20 is a detail perspective view of a follower tongue and bracket used in carrying out the invention, as illustrated in Fig. 19 and showing the follower tongue engaging the teeth of the spiral slab milling cutter;

Fig. 21 is a fragmentary top plan view of a part of the tool supporting portion of the grinding machine illustrating the use of an extension tail center for supporting one end of a long pilot reamer;

Fig. 22 is a side elevation of a spindle center used in carrying out the invention;

Fig. 23 is a top plan view of a grinding frame for supporting a planer blade removed therefrom and adapted to be mounted on the tool supporting portion of the grinding machine between the tail and spindle centers.

Fig. 24 is an assembly view of the grinding frame carrying a planer blade and having a top plate mounted thereon;

Fig. 25 is a fragmentary end elevation of a straight edge grinding wheel in an operative position for producing a hollow grind on the outer cutting edge of the planer blade;

Fig. 26 is a similar view showing the face of a cup grinding wheel in an operative position for producing a straight angle grind on the planer blade;

Fig. 27 is a fragmentary sectional view of an auxiliary tool holder supporting a straight toothed end mill cutter with a tapered shank, with the tool holder being mounted on a main tool holder and illustrating the face of a cup wheel grinding the beveled cutting outer end of the end mill;

Fig. 28 is a fragmentary side elevation showing the manner of obtaining clearance of the grinding wheel on the outer end of the teeth of the end mill cutter, illustrated in Fig. 27;

Fig. 29 is a fragmentary top plan view of the grinding machine including a variable speed drive shown in an operative position for grinding valves;

Fig. 30 is an enlarged sectional view of a portion of Fig. 29 taken on the line 30—30 of Fig. 29;

Fig. 31 is a vertical sectional view partly in elevation taken on the line 31—31 of Fig. 30;

Fig. 32 is a horizontal sectional view of a tool supporting portion for supporting a valve to be ground, taken on the line 32—32 of Fig. 30;

Fig. 36 is a fragmentary view illustrating the manner of salvaging a worn milling cutter showing a disk grinding wheel having a rounded circumferential edge in an operative position for producing a rounded inner surface between the teeth of the worn milling cutter;

Fig. 37 is a fragmentary view illustrating the use of a cup grinding wheel in an operative position for grinding the teeth of a worm milling cutter to a point;

Fig. 38 is a fragmentary view illustrating the cup grinding wheel in an operative position for grinding the points of the teeth of the milling cutter;

Fig. 39 is a side view of a division plate used in carrying out the invention when salvaging worn milling cutters, and Fig. 40 is a sectional view thereof taken on the line 40—40 of Fig. 39.

Figure 1:
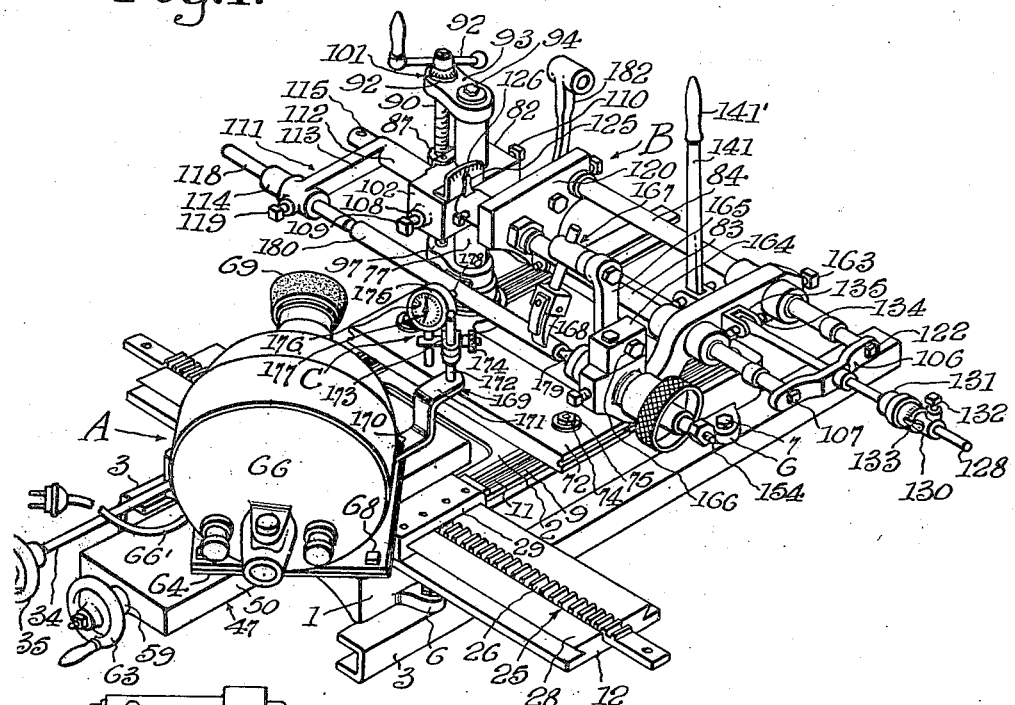
Fig. 1 is a perspective view of the improved universal grinding machine illustrating the use of a test bar adapted to be engaged by an indicating device for determining the setting of a tool holding portion of the grinding machine.

Referring more specifically to the drawings the universal grinding machine includes a grinding part A and a tool supporting part B mounted on a base 1 including a top 2, which base 1 is in turn mounted on a pair of channel irons 3 adapted to be mounted on any suitable surface 4. The base 1 is made of any suitable material such as cast iron and is provided with side walls 5 having lugs 6 extending from the lower corners thereof, which lugs 6 are secured to the channel irons 3 by bolts 7 or the like. By providing the narrow channel irons 3 with rounded webs and edges, dust and dirt may be prevented from collecting thereon and with the top 2 of the base 1 being raised from the channel irons, ample room is afforded for cleaning under the machine. The top 2 of the base is provided with cut-out portions 8 and 8' and two raised longitudinal extending guides 9, which extend substantially the entire length of the base 1. Each of the guides 9 is provided with a groove 10 having a slot 11 extending downwardly therefrom through the top 2 of the base.

The guides 9 provide means for adjustably supporting the grinding part A of the machine, which grinding part A comprises a motor support including a transversely extending platen 12 mounted on one end of the base 1 and provided with downwardly extending tongues 13 fitted to slide smoothly in the grooves 10 on the top 2 of the base 1. The platen 12 illustrated more particularly in detail in Figs. 4 and 5 is moved longitudinally on the base 1 by means of a cross feed screw 14 rotatably supporting in a bearing 15 formed on one side of the base. The cross feed screw 14 extends longitudinally of the base 1 parallel with the guides 9 and threadably engages a lug 16 which extends downwardly from the platen 12 at its center through the cut-out portion 8 of the top 2 of the base 1. The platen cross feed screw 14 is provided on one end with a hand wheel 17 and is held in a rotative position on the bearing 15 by means of a collar 18, secured to the screw 14 by a pin 19. To lock the platen 12 in an adjusted position on the base 1, stud bolts 20 are provided thereon, which extend through the slots 11 of the base 1 and have nuts 21 and locking pads 22 mounted on the outer end thereof. In order to indicate the amount of adjustment to be given to feed screw 14, for moving the platen 12 on the base 1, a graduated scale 23, as illustrated in Figs. 2 and 3, is formed on the hub of the hand wheel 17 and an index 24 is formed on the bearing 15. The platen 12 is provided with a groove 25 which extends longitudinally the entire length of the platen and has a toothed rack 26 fitted therein which is secured in place by means of countersunk screws 27 or the like. The top surface of the platen 12 is provided with a dove-tailed rib 28, machined to a smooth finish to insure an accurate smooth bearing surface for a supporting member 29, having a dove-tail guide or way 30, and gib 31 to provide a sliding fit of the supporting member 29 with the platen 12. The gib 31 is held in place by binder screws 32 which act as a medium of adjustment for clearance between the dove-tail rib 28 on the platen 12 and way 30 on the supporting member 29.

The supporting member 29 is moved transversely of the machine by means of a pinion gear 33, engaging with the rack 26 on the platen, which pinion gear 33 is mounted on the inner end of a shaft 34 having a wheel 35 containing a handle 35' on its outer end. The end of the shaft 34 is rotatably supported on a bushing 36, mounted in a housing 37 of the member 29, which bushing 36 is secured in place by means of a screw 38, threadably engaging in an aperture 39 drilled through the housing 36. The screw 38 extends into an oil hole 40, drilled through the bushing 36 to the shaft 34 and by removing the screw 38, the aperture 39 and hole 40 serve as a medium for oiling the shaft 34 of the pinion gear 33 and when the screw 38 is mounted therein it serves to make the oil hole 40 dust proof and also acts as a keeper for the bushing. In order to lock the member 29 in an adjusted position on the platen 12, a binder screw 41 is threadably mounted through a boss 42 formed on one side of the member, as illustrated in Figs. 7 and 19. The binder screw 41 has a handle 43 on the outer end thereof, which handle 43 is adapted to operate the screw 41 for exerting a pressure on the gib 31, thereby binding the member 29 in an adjusted position on the platen 12. A boss 44 is formed on the member 29, which boss 44 is provided with graduations 45 on its upper or peripheral surface and has a smooth bore 46 through its center. Rotatably mounted on the boss 44 of the member 29 is a compound rest 47 which comprises a base or lower portion 48 having a shank 49 extending downwardly therefrom, which closely fits into the bore 46 of the boss 44 of the member 29 and an upper portion 50 having a boss 51 extending upwardly therefrom adjacent to one end thereof. The base 48 of the compound rest 47 has an index 52 provided thereon, adjacent to the graduations 45 on the boss 44 of the member 29.

The compound rest 47 is adapted to rotate freely on the member 29 in the boss 44 and in order to lock it in any desired degree of position thereon, a binding screw 53 having a locking pad 54 thereon is threadably mounted on the boss 44 of the member 29. The top surface of the base portion 48 of the compound rest 47 has a dove-tail guide or way 55 formed thereon, in which a dove-tail rib 56 on the lower surface of the upper portion 50 of the compound rest is slidably mounted. To provide proper clearance between the way 55 on the lower portion 48 of the compound rest and the dove-tail rib 56 on the lower surface of the upper portion 50 thereof, a gib 57 is provided, which is held in place by screws 58. The front end of the upper portion 50 of the compound rest is turned downwardly and has a boss 59 formed thereon, providing a bearing for the outer end of a lead screw 60, which extends into a cut-out portion 61, between the lower and upper portions 48 and 50 of the compound rest. The screw 60 threadably engages a block 62 suitably mounted on the base portion 48 of the compound rest and has a hand wheel 63 suitably mounted on the outer end thereof.

A motor carrier 64 having a downwardly extending shank 65, is provided for supporting an electric motor 66 connected to a suitable source of supply (not shown) by the conductors 66'. The shank 65 of the motor carrier 64 is freely rotatable in a bore 51' formed in the boss 51 on the upper portion 50 of the compound rest and the motor carrier 64 is held in an adjusted position on the upper portion of the compound rest by means of a locking screw 67. The motor 66 is mounted on the motor carrier 64 by screws 68 and has a grinding wheel 69 on the outer end of the motor shaft. Graduations 70, in thousandths of an inch are provided on the peripheral upper edge of the boss 51 of the compound rest and an index 71 is provided on the lower peripheral edge of the motor carrier 64. By turning the hand wheel 63 mounted on the lead screw 60, the upper portion 50 of the compound rest is moved on the lower portion 48 thereof, whereby the grinding wheel 69 is moved into any grinding depth on the piece of work to be ground, and by means of the graduations 70 and the index 71, the grinding motor 66 may be set at any desired angle and held firm on the upper portion 50 of the compound rest, by means of the locking screw 67. The grinding motor 66 is perfectly balanced, consequently there is no vibration and hence the grinding wheel 69 produces a smooth surface on a piece of work without ripples or vibration marks.

On the other end of the base 1, is the tool holding portion B of the grinding machine for carrying a piece of work to be ground, which portion B comprises a base plate 72 adjustably mounted on the other end of the base 1 by means of two downwardly extending tongues 73, which slidably fit into the longitudinally extending grooves 10 to the upper surface of the base 1. The base plate 72 is adjustably mounted and held in a fixed position on the other end of the base 1 by means of bolts 74, which extend upwardly through the longitudinally extending slots 11 in the base 1, and the base plate 72, where they are held in adjusted position by means of nuts 75. A boss 76 is formed on the rear end of the base plate 72, which boss 76 carries a standard or support 77 made preferably of forged steel and machined smooth. The lower end of the standard 77 is reduced in diameter forming a downwardly extending portion 78 machined to fit into a bore 79 formed in the boss 76 of the base plate 72, and forms a shoulder 80, which engages the upper end of the boss 76 and acts as a bearing stop. The standard 77 is turned straight and smooth above the shoulder 80 and has a keyway 81 running the full length thereof from the shoulder 80 to the upper end thereof. Adjustably mounted on the standard is a guide bar carrier head or block member 82 for a frame, said frame comprising a main guide bar 83 and an auxiliary guide bar 84 mounted thereon. The guide bar carrier head 82 is held in an adjusted position on the standard by means of a key 85 fitting into the keyway 81 on the standard. To lock the standard 77 in an adjusted position on the base plate 72, a screw 86 is threadably mounted in the boss 76 of the base plate 72. A feed block 87 is secured on one end of the guide bar carrier head 82 by means of screws 88 as more particularly illustrated in Figs. 12 and 13, which feed block 87 has a central screw threaded aperture 89 therein, for receiving a feed screw 90 adapted to vertically adjust the guide bar carrier head 82 on the standard 77. The upper end of the feed screw 90 has a graduated disk 91 and a handle 92 fixably secured thereto and is rotatably mounted in the outer end of a top plate 93, which fits over the upper end of the standard and held in place thereon by a cap screw 94 and dowel pin 95. The lower end of the feed screw 90 is rotatably mounted at 96 in the outer end of a strap 97, bored at its inner end to fit over the shoulder 80 on the lower end of the standard, where it is screwed in place by a set screw 98.

An index finger 99 is mounted on the strap 97, which index finger 99 extends downwardly to adjacent the outer cylindrical upper edge of the boss 76 having graduations 100 formed thereon and an index 101 is provided on the top plate 93 for indicating the degree of turning of the feed screw 90 for vertically adjusting the guide bar carrier head 82 on the standard 77. The guide bar carrier head 82, which is preferably made of forged steel is formed with an outwardly extending portion 102, provided with a horizontally extending bore 103 fitted with a bushing 104, in which one end 105 of the main guide bar 83 is adjustably fitted, with the other end of the main guide bar 83 being mounted in one end of a tie bridge 106 and held in position thereon by bolt 107. The outer end of the portion 102 of the guide bar carrier head 82, has a turned boss 108 formed thereon having a locking screw 109 and pad 109', threadably mounted therein for locking the main guide bar 83 in an adjusted position on the guide bar carrier head 82. The opposite end of the guide bar carrier head 82, from the outwardly extending portion 102 thereof has a locking screw 110 threadably mounted therein for rigidly holding the carrier head in an adjusted position on the standard 77. The end 105 of the main guide bar 83 extends through the guide bar carrier 111 thereon, comprising a horizontally extending portion 112 in alignment with the main guide bar 83 and an arm 113 containing a horizontally extending portion 114 at its front end at a right angle to the portion 112. The tail center carrier 111 is adjustably mounted on the guide bar carrier head 82 by means of a locking screw 115, which extends through the horizontally extending portion 112 on the rear end of the tail center carrier 111 and threadably engages in a threaded bore 116, as illustrated in Fig. 11, formed in the end 105 of the main guide bar 83. The horizontally extending portion 114 on the front end of the arm 113 of the tail center carrier is bored at 117 for receiving one end of tail center 118 which is adjustably locked in a fixed position by means of a screw 119.

The auxiliary guide bar 84 is made shorter than the main guide bar 83 and is held in a spaced parallel relation with the main guide bar by means of a spider 120 and the tie bridge 106. One end of the auxiliary guide bar 84 is mounted in the rear end of the spider 120, where it is held in position thereon by means of a screw 121 and the other end of the auxiliary guide bar is mounted in the other end of the tie bridge 106 where it is held in position thereon by means of a bolt 122. The front end of the spider 120 is mounted on the main guide bar 83 against the collar 123, secured to the main guide bar by a screw 124, said collar 123 containing a pointer 125, adapted to indicate the amount of adjustment of the guide bars 83 and 84 by means of a graduated plate 126 mounted on the guide bar carrier head 82. The tie bridge 106 is provided with a central aperture 127, in which a rod 128 having a limit stop 129 is adjustably mounted on the outer end thereof. The limit stop 129 comprises a sleeve 130 slidably mounted on the outer end of the rod 128 and a barrel 131 threadably mounted on the sleeve 130. The sleeve 130 is held in an adjustable position on the rod 128 by a screw 132 and has a pointer 133 thereon which is adapted to cooperate with mill graduations 134 formed on the barrel 131 for indicating the amount of turning of the barrel 131 on the sleeve 130. The inner end of the rod 128 is connected by a pin 134 to one end of a yoke 135 provided with a threaded stem 136 mounted in a connecting part 137 of two bearing portions 138 of a tool carrying member 139, which portions 138 are slidably mounted on the guide bars 83 and 84. The threaded stem 136 of the yoke 135 extends through the connecting part 137 of the tool carrying member 139 and is screwed to a yoke 140 having an operating arm 141 pivoted at 142 thereto, as more particularly illustrated in Figs. 10 and 11. The lower end of the operating arm 141 is pivoted at 143 to one end of an operating link 144, pivoted at its other end to an anchor 145 mounted on a depending portion 120' of the spider 120. The tool carrying member 139 has an outwardly projecting portion 146 having a longitudinally extending bore 147 formed on the outer end thereof, which bore 147 is fitted with a bushing 148 having a hardened and ground tapered spindle 149 therein. The spindle 149 is provided with a bore 150 extending the full length thereof and is rotated by a hand wheel 151 which is threaded on the rear end of the spindle for taking up lateral and bearing play and held in place thereon by a screw 152. An arbor 153 is mounted on the cutting end of the spindle 149 and held in place thereon by a draw bolt 154, which is fitted through the bore 150 of the spindle and has a nut 155 threadably mounted on its rear end, with one end of the arbor 153 fitting into a tapered inner surface 156 at the front end of the spindle. The arbor 153 is reduced in diameter at its front end, providing a shoulder 157 against which an angle milling cutter 158, as illustrated in Figs. 1 and 2 is adapted to abut and be held in position against the shoulder by a member 159, which is acted on by nut 160, threadably mounted on the outer end of an extension 161 formed on the arbor 153. The spindle 149 is locked in any desired position on the tool carrying member 139, by means of a screw 162 and the entire tool carrying member 139 may be locked in any desired position on the guide bars 83 and 84 by means of a screw 163. A block 164 is formed on the outer end of the tool carrying member 139 and an upwardly extending arm 165 is secured at its lower end to the block 164 by a bolt 166. A holder 167 having a ratchet 168 mounted thereon is mounted on the upper end of the arm 165.

A device C, as illustrated in Figs. 1 and 19, for indicating the desired angle that the tool carrying member 139 is to be set is provided on the machine, whereby a certain grinding operation may be produced on the tool to be ground, which device C comprises a bracket 169 pivoted at one end to the motor carrier 64 by means of a bolt 170, said bracket including a horizontally extending portion 171, having a vertically extending post or rod 172 mounted on its outer end. The post 172 has a supporting member 173 adjustably mounted thereon by a clamping screw 174, which supporting member 173 carries an indicating device 175 including a dial having graduation 176 thereon, and an indicating pointer or hand 177 which is actuated by a button 178 extending from the rear of the indicating device 175.

In operation before the bevel milling cutter 158, illustrated in Fig. 2, is mounted on the spindle 149 of the tool carrying member 139, a center 179, as illustrated in detail in Fig. 22, is fitted into the front or cutting end of the spindle with the draw bolt 154 being threadably connected to the spindle center 179 for holding it in position on the spindle, as illustrated in Fig. 1. An aligning or test bar 180, as illustrated in Fig. 1, is then installed between the tail center 118 and the spindle center 179 and the locking screw 86 for holding the standard 77 in an adjusted position on the boss 76 of the base 72 is unloosened. The standard 77 is then rotated on the boss 76 of the base plate 72 until the pointer 99 on the strap 97 mounted on the lower end of the standard, registers with one of the graduations 100 on the milling cutter 158 after which the locking screw 86 is tightened very lightly to permit the standard 77 to be moved by the hand against the action of the locking screw.

The device C for indicating the taper per foot of the angle milling cutter 158 is then moved on the motor carrier 64 until the button 178 for operating the pointer 177 of the indicating device 175 is in contact with the low point of the test bar 180. By turning the hand wheel 35 the shaft 34 is rotated, thus rotating the pinion gear 33 on the inner end of the shaft 34 which is caused to travel in the tooth rack 26 on the platen 12, thus slidably moving the motor carrier support 29 on the platen 11 and causing the button 178 to travel across the full length of the test bar. The button 178 traveling in contact with the test bar 180 actuates the pointer 177 around the dial, thus indicating on the graduations 176, the approximate setting of a cutting tool adapted to be mounted on the spindle 149 for producing the desired degree of taper per foot on the cutting tool. By tapping the guide bars 83 and 84 lightly with the hand, the exact degree of taper per foot may be obtained, after which the locking screw 86 is tightened to hold the standard 77 in its adjusted position.

Then in order to obtain the cutter clearance the screw 109 is loosened from the guide bar carrier head 82 which permits the main guide bar 83 to be rotated carrying the auxiliary guide bar 84 and the tool carrying member 139 with it. The rotation of the guide bar 83 also causes the collar 123 mounted thereon to rotate therewith, thus moving the pointer 125 across the graduated plate 126 to the desired degree of cutter clearance. The screw 109 is then tightened to lock the main guide bar 83 in its adjusted position, after which the screw 110 is unloosened and the guide bar carrier head 82 is raised or lowered on the standard 77, carrying the guide bars 83 and 84 and the tool carrying member 139 with it. When the center of the grinding wheel 69 is in line with the longitudinal center of the test bar 180 the screw 110 is screwed into engagement with the standard 77, whereupon the tool carrying portion B of the machine is held in a fixed position for affording a particular taper grinding operation on an angle milling cutter. The test bar 180 and spindle center 179 are then removed by unloosening the draw bolt 154, and an angle milling cutter 158, illustrated in Figs. 2 and 3, is mounted on the tail center 118 and the arbor 153 mounted on the spindle 149 with the milling cutter 158 being secured to the arbor by means of the member 159 and nut 160 mounted on the extension 161 of the arbor. A slight pressure is then applied to the operating arm 141 by means of the handle 141' and the screw 163 is tightened until the inner end thereof contacts with the auxiliary guide bar 84, thus holding the tool carrying member 139 in a fixed position on the guide bars. The ratchet 168 on the holder 167 is then caused to engage between the teeth on the angle milling cutter 158. By rotating the hand wheel 17 the entire grinding portion A of the machine may be moved on the base plate 1 and by rotating the handle 63 on the lead screw 60, the upper part 50 of the compound rest is slidably moved on the lower part 49 thereof, thus moving the motor 66 toward the angle milling cutter 158 for bringing the grinding wheel 69 into contact with the teeth of the milling cutter, then by rotating the hand wheel 35 the pinion gear 33 is caused to engage with the tooth rack 26, thus slidably moving the member 44 on the platen 12 carrying the compound rest 47 and the motor carrier 64 having the motor 66 mounted thereon with it, thereby moving the grinding wheel 69 across the milling cutter. The hand wheel 35 may be operated by one hand for moving the grinding wheel 69 across the angle milling cutter 158 and the milling cutter may be revolved after each operation by the other hand.

In grinding straight reamers, as illustrated in Fig. 14, the locking screw 86 on the boss 76 of the base plate 72 is unloosened, whereupon the standard 77 may be rotated until the pointer 99 on the standard points to zero on the graduations 100 on the boss 76 of the base plate 72, as illustrated in Fig. 10. After the angle milling cutter 158 is removed, the center 179 is again mounted on the spindle and the test bar 180 is placed between the centers. The button 178 of the indicating device 175 is then brought into contact with the test bar for testing perfect alignment thereof. The test bar 180 is then removed and the straight reamer 181, as illustrated in Fig. 14 is placed between the centers 118 and 179. The handle 141' on the operating arm 141 is grasped by the hand and a slight pressure is exerted thereon and the screw 163 is tightened to engage the auxiliary guide bar 84 for locking the tool carrying member 139 in position on the guide bars. The ratchet 168 which is mounted in a holder 167' mounted on the outer end of an arm 182 pivoted at its rear end to the spider 126 is then placed in the teeth of the straight reamer 181 which permits the reamer to be rotated in one direction. The straight reamer 181 is then brought to a position where the center of the grinding wheel 69 is in the longitudinal center of the reamer in the same manner as previously described for the angle milling cutter 158 and the straight edge milling cutter 158'. After proper angle of clearance has been obtained by means of the pointer 125 on the collar 123 on the main guide bar 83 and the graduated scale 126 on the guide bar carrier head 82, the edge of the grinding wheel 69 is fed against the teeth of the reamer 181 by means of the hand wheel 63, and fed across the straight reamer by the hand wheel 35 as above described.

In grinding tapered reamers, as illustrated in Fig. 15, the straight reamer 181 is removed and the center 178 is again placed on the spindle 149. The test bar 180 is placed between the centers 118 and 179 and the bracket 169 is rotated on its pivot 170 until the button 178 on the indicating device 175 is brought into contact with the low point on the test bar for obtaining the proper degree of taper per foot of a tapered reamer. A tapered reamer 183, as illustrated in Fig. 15, is then mounted on the spindle 149 and all of the operations of the machine are performed as previously described in grinding the angle milling cutter 158.

In grinding long milling cutters, such as a pilot reamer 184, as illustrated in Fig. 21, which extends beyond the limit by which the grinding motor 66 may be adjusted on the grinding portion A of the machine for producing a grinding operation, the center carrier 111 is adjusted on the end 105 of the main guide bar 83 so as to cause the arm 113 thereof to extend toward the rear instead of toward the front of the machine. The tail center 118 is removed from the center carrier 111 and an adjustable extension tail center carrier 185 is mounted on the center carrier 111, which extension tail center carrier comprises a shaft 186 having one end adjustably mounted in the outer end of the arm 113 of the center carrier 111 and extending at a right angle thereto and an arm 187 on the outer end extending at a right angle to the shaft 186. The adjustable extension tail center carrier 185 is elevated at an angle and an extension tail center 188 is mounted on the outer end of the arm 113 of the extension tail center carrier 185 replacing the tail center 118 on the tail center carrier 111. The pilot reamer 184 is placed between the extension tail center 188 and the spindle center 179 and brought into proper alignment by means of the indicating device C before grinding, as heretofore described. After the pilot reamer has been brought into proper alignment the screw 115 is tightened and the milling cutter is ready to be ground.

In grinding slab milling cutters (not shown), the steps in the operation of the machine are the same as described above for grinding straight reamers. To grind spiral slab milling cutters the spindle center 179 is mounted on the spindle 149 and the ends 180 of the spiral slab milling cutter 190, as illustrated in Figs. 19 and 20, are placed between the centers 118 and 179. The ratchet 168 is removed from its holder 167, as it is not used in grinding spiral slab milling cutters, but a tooth rest is employed which comprises a wide flat forked tongue 191 adapted to engage in the spiral teeth 192 of the spiral slab milling cutter 190. The forked tongue 191 is slidably mounted at its lower end in one end of a guide portion 193 of a tongue supporting member 193' which includes a vertically extending portion 194 and a horizontally extending portion 195 slidably mounted on a bracket 196 secured at one end by a screw 197 to the upper part 50 of the compound rest 47. The lower end of the guide portion 193 is hingedly connected at 198 to the upper end of the vertically extending portion 194 of the tongue supporting member 193'. The guide portion 193 is held in adjusted position on the tongue supporting member 193' by means of a threaded stem 199 which is secured at one end to the guide portion 193 of the tongue supporting member 193'. The threaded stem 199 extends through a slot 200 in the tongue 191 and has a nut 201 threadably mounted on its other or free end, whereby on tightening up of the nut 201 the tongue 191 is held in an adjusted position on the supporting member 193'. The horizontally extending portion 195 of the tongue supporting member 193' is slidably mounted in a dove-tail guide 202 formed on the bracket 196 and has a longitudinally extending slot 203 formed therein through which a threaded stem 204 projects. The threaded stem 204 is secured at one end to the bracket 196 and has a nut 205 threadably mounted on its outer or free end whereby upon screwing up on the nut 205 the tongue supporting member 193' is held in adjusted position on the bracket 196. In order to hold the upper free end of the tongue 191 in the teeth 192 of the spiral slab milling cutter, a spring finger 206 is provided which is secured at its lower end to the vertically extending portion 194 of the tongue supporting member 193' by screws 207 or the like. The spring finger 206 is adapted to bear against the guide portion 193 at its upper or free end, whereby a pressure is exerted on the guide portion for holding the tongue 191 in engagement with the spiral slab milling cutter. In grinding the spiral slab milling cutter 190, the grinding wheel 69 is brought against the face of the teeth 192 thereof, as illustrated in Fig. 19, and the center of the grinding wheel is brought to the horizontal center of the spiral slab milling cutter by means of adjusting the guide bar carrier head 82 on the standard 77 as above described. The tongue supporting member 193' is then adjusted on the bracket 196 a sufficient distance that the tongue 191 clears the grinding wheel 69. The upper ends of the forked tongue 191 are shaped to the contour of the spiral teeth 192 of the spiral slab milling cutter 190 and are pressed against the cutter by the spring finger 206 for assuring a perfect bearing on both ends of the fork-shaped tongue 191. This is very essential as the center of the grinding wheel 69 must travel past both ends of the spiral slab milling cutter. If the grinding wheel 69 did not travel the full length of the cutter, with the center of the grinding wheel passing both ends thereof, the cutter would have a high point on each end and consequently the face of the teeth on the cutter would not be straight after a grinding operation. Therefore by using a tongue having wide forked-shaped ends which are shaped to the contour of the spiral teeth 192 on the spiral slab milling cutter 190 or in other words are spirally formed, the tongue is still in one of the spiral grooves between the teeth 192 of the cutter after the grinding wheel has past an end of the cutter. By pressing forwardly on the guide portion 193 of the tongue supporting member 193' the spiral slab milling cutter 190 may be rotated for causing the tongue to engage in a groove between the teeth of the cutter adjacent to the tooth which has already been ground.

Grinding the face of the teeth 192 of the spiral slab milling cutter 190 by the outer face of the grinding wheel 69 is believed the most practical, but in case it is desired to produce a hollow ground on the teeth of the cutter, the locking screw 67 is unscrewed to permit the motor 66 to be rotated in the boss 51 on the compound rest, until the index 71 registers with one of the graduations 70 on the boss 51, corresponding to the angle of the grinding wheel.

Figure 33:
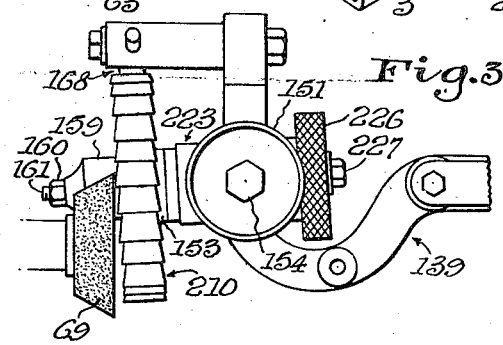
Fig. 33 is a fragmeneary side view of the tool supporting portion of the machine having a straddle milling cutter mounted thereon, and illustrating the face of a cup grinding wheel in an operative position for grinding a side of the teeth of the straddle milling cutter.
Figure 35:
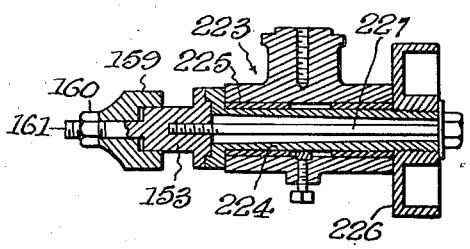
Fig. 35 is a longitudinal sectional view of a tool supporting portion for mounting the straddle milling cutter on the tool carrying portion.
Figure 34:
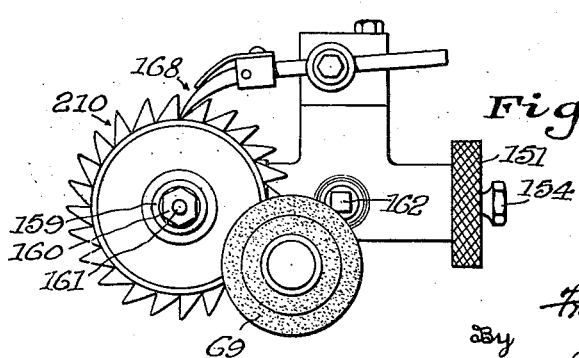
Fig. 34 is an end view thereof.

In grinding the point on the teeth of a slitting saw 209, as illustrated in Fig. 11, or a straddle mill 210, as illustrated in Figs. 33 and 34, assuming that the standard 77 is adjusted to a position on the boss 76 of the base plate 72, that the pointer 99 thereon points to zero and the graduations 100 on the boss 76 and the test bar 180 has been placed between the centers 119 and 179 and brought into perfect alignment with the face of the grinding wheel 69 by means of the indicating device C, as above described, the spindle center 179 is then removed and the slitting saw 209 or the straddle mill 210 are secured to the arbor 153 on the spindle 149 by means of the member 159 and nut 160. The ratchet stop 168 is mounted on the ratchet holder 167 and the arm 169 is moved forward until the ratchet stop engages between the teeth on the slitting saw 209 or the teeth of the straddle milling cutter 210. The binding screw 163 on the tool carrying member 139 is unscrewed allowing the tool carrying member to be slidably moved on the guide bars 83 and 84 by means of the operating arm 141, which causes the slitting saw 209 or straddle mill 210 on the spindle 149 to move across the face of the grinding wheel 69. If desired, the stop 129 may be adjustably moved on the rod 128 to limit the amount of movement of the tool carrying member 139 by the operating arm 141. The grinding wheel 69 is fed into the slitting saw or straddle mill by means of the hand wheels 63, as previously described. The operating arm 141 may be operated by one hand to move the slitting saw or straddle mill across the grinding wheel 69 and the other hand may be used to rotate the slitting saw 199 or the straddle mill one tooth at a time against the ratchet stop 168.

To grind small end mills with straight shanks, the straight shank 211 of the end mill 212, as illustrated in Figs. 16, 17 and 18, may be held in a universal chuck 213, as shown, or in a draw collet. The holder 167 and ratchet stop 168 is removed from the outer end of the arm 165 and mounted on the outer end of an angle extension 213 which is secured at its inner end to the arm 165 by a screw 214. A straight edge grinding wheel 69' is substituted for the cup grinding wheel 69 on the shaft of the motor.

After the motor carrier 29 has been locked in adjusted position by the screw 67, the screw 58 is tightened to force the gib 31 against the dove-tail groove 30 on the lower part of the compound rest, thus locking the rib 28 on the platen 12 and motor carrier support 29 in a fixed position on the platen. By turning the screw 60 by the hand wheel 63 the upper part 50 of the compound rest 47 is moved inwardly on the lower part 48 thereof, thus moving the motor 66 and hence the straight edge of the grinding wheel 69' toward the spiral flutes 215 on the end mill 212. The grinding wheel 69' is brought in just far enough to the outer end of one of the spiral flutes 215 on the end mill 212 that the inward side of the straight edge of the grinding wheel thereof just clears the cutting edge of the spiral flute adjacent to the first mentioned flute. The guide bars 83 and 84 are raised or lowered on the standard 77 to bring the face of the grinding wheel to the desired clearance as heretofore described. The binding screw 163 on the tool carrying member 139 is unloosened and the operating arm 141 is actuated to bring the outer end of the end mill 212 against the straight edge of the grinding wheel 69'. The stop 129 is adjustably set on the rod 128 a predetermined distance by the screw 132 and the barrel 131 is turned on the sleeve 130 a distance to allow the tool supporting member 139 to be moved a certain distance for moving the end mill 212 into the grinding wheel 69' an amount which is necessary to accomplish a clean cutting edge on the outer ends of the flutes 215 of the end mill. The desired setting of the barrel 131 on the sleeve 130 is determined by the mill graduations 134 on the barrel and the pointer 133 on the sleeve 130. The end mill 212 is revolved against the ratchet stop 168 to bring another flute on the end mill into the position to be ground. By operating the arm 141, the tool carrying member 139 is moved along on the guide bars 83 and 84 to accomplish the grinding operation.

In grinding end mills with five or more flutes and tapered shanks, a tool support 216 is mounted at a right angle on the spindle 149 by means of the draw bolt 154, as illustrated in Fig. 27, and the tapered shank 217 of the end mill 218 is mounted in a tapered bore 219 provided in a spindle 220 which is rotatably supported in a bushing 221 mounted in the holder 216 and held in a locked position on the support by means of a hand wheel 222. The motor 66 is adjusted on the boss 51 of the compound rest 47 until the index 71 registers with a zero graduation on the boss 51 and the cup grinding wheel 69 is substituted for the straight edge grinding wheel 69'. The grinding operation is the same as for grinding end mills having straight shanks and a cutter clearance is obtained by turning the spindle 149 on the tool carrier 139 with the hand wheel 151, which moves the right angle tool support 216 at an angle, as illustrated in Fig. 28, after which the screw 162 is tightened to lock the spindle 149 in an adjusted position. The tool carrying member 139 is then actuated on the guide bars 83 and 84 by the operating arm 141 to move the end mill 218 across the face of the grinding wheel 69. The amount of travel of the end mill 218 is controlled by the stop 129 on the rod 128, as previously described.

To grind the sides of the teeth of the straddle milling cutter 210, as illustrated in Figs. 33 and 34, the cutter is mounted on a tool supporting head 223 including a spindle 224 which in turn is secured to the spindle 149 on the tool carrying member 139 by means of the draw bolt 154 and extends at a right angle to the spindle 139. The arbor 153 is removed from spindle 149 and fitted on the spindle 224 mounted in a bushing 225 on the tool supporting head 223. The spindle 224 is provided with a bore extending the full length thereof and has a hand wheel 226 threadably mounted on its rear end. A draw bolt 227 extends from the hand wheel 226 through the bore of the spindle 224 and threadably engages with the arbor 153. The cutter clearance is obtained by moving the spindle 149 on the tool carrying member 139 with the hand wheel 151 and locking it in place by the screw 162. The straddle milling cutter 210 is moved across the face of the grinding wheel 69 by actuating the tool carrying member 139 on the guide bars 83 and 84, by means of the operating arm 141, and the amount of travel of the straddle milling cutter is regulated by the stop 129, as previously described. The straddle milling cutter 210 is revolved in one direction by the hand wheel 226 on the tool supporting head 223 away from the ratchet 168 to bring one tooth after another of the straddle milling cutter into engagement with the grinding wheel.

In grinding planer blades or other flat objects, an angle support is provided, as illustrated in Figs. 23 to 26 inclusive, which support is in the form of an angle iron comprising a flat rear portion 228 and a flat side portion 229 at a right angle thereto. The angle support has a plurality of aligned and spaced threaded openings 230 formed in the front flat side portion 229 thereof and is provided with bearing plates 231 on its ends, which are adapted to engage with the tail center 118 and the inner end of the draw bolt 154. A planer blade 232 is mounted on the front side portion 229 of the angle support and the top plate 233 containing aligned and spaced threaded openings 234 is mounted on the planer blade. The openings 230 and 234 in the angle support and top plate 233 register with each other and have threaded bolts 235 mounted therein for holding the planer blade on the angle support. After the planer blade 232 or other flat object has been mounted on the angle support, the support is revolved by the hand wheel 151 on the tail center 118 and spindle 149, until the cutting edge of the planer blade is in a position to cause the grinding wheel 69 to produce the desired degree of angle thereon. The face of the grinding wheel 69 is then brought into contact with the cutting edge of the planer blade by actuating the cross feed screw 60 by the hand wheel 63, as described above, and the grinding wheel is passed across the face of the cutting edge of the planer blade by operating the pinion gear 33 through the shaft 34 and hand wheel 35. To produce a straight angle ground on the cutting edge of a planer blade, the edge of the grinding wheel is brought into contact with the cutting edge of the planer blade, as illustrated in Fig. 26, and to produce a hollow ground on the cutting edge of the planer blade, the motor 66 is adjusted until the side of the cup grinding wheel 69 engages the cutting edge of the plane blade, as illustrated in Fig. 25.

To grind engine valves an electric motor 235, connected to a suitable source of electrical supply by conductors 237, is provided. The motor 236 has a gear housing 238 on one end thereof containing an arm 239 extending downwardly therefrom which is secured at its lower end by a bolt 240 to a boss 241 formed on the outwardly extending portion 146 of the tool carrying member 139. On the outer end of the motor shaft 242 is a pinion 243 which meshes with a large reduction gear 244 fixedly mounted on a shaft 245, which is rotatably mounted in the housing 238. A pinion 246 is also mounted on the shaft 245 which pinion 246 meshes with a large reduction gear 247 mounted on the inner end of a shaft 248 which extends through a cover plate 249 and has a drive pulley 250 mounted on its outer end. A belt 251 engages in the pulley 250 and also engages with a pulley 252 secured to the hand wheel 151 mounted on the rear end of the spindle 149 of the tool carrying member 139. Upon starting the motor 236 the belt 251 on the pulley 250 will drive the pulley 252 which in turn rotates the spindle 149, thus rotating the valve 253 mounted thereon, as illustrated in Figs. 29 and 32.

Milling cutters which have been put to excessive use and sharpened many times become practically useless, due to the fact that the cutting angle of the cutter becomes exceedingly long while the chip clearance is reduced to a minimum or to a point where the chips clog in the teeth and impair the work or in most cases break the cutter. To salvage the worn cutters in a simple and quick manner for making them practically as good as new, reference is had to Figs. 36 to 38 inclusive, wherein a disk grinding wheel 254 having a rounded circumferential edge 255 is raised high enough to pass under the milling cutter 256, and the disk grinding wheel is then brought into contact with the cutter between the teeth thereof, producing a rounded inner bottom between the teeth, whereby the cutter is prevented from cracking. The limit stop 129 is not necessary in this operation and due to the fact that in many cases teeth are broken out of a used cutter, the ratchet 168 cannot be used on the teeth of the cutter, but is adapted to engage into a plurality of grooves 257 provided in division plates 258, as illustrated in Figs. 39 and 40, which division plates 258 may be secured either in back of the cutter or the arbor 153, or under the head of the draw bolt 154. The same operation is repeated, but in this case a cup wheel 69 is used, as illustrated in Fig. 37, for grinding the teeth of the cutter to a point, with the bottom of the teeth left rounded. The face of the cup wheel 69 is then brought to the outer point or face of the teeth of the cutter, as shown in Fig. 38, and the cutter is then adjusted to the proper clearance angle. The grinding wheel is then fed into the cutter and the operating arm 141 is then actuated to move the tool carrying member 139 on the guide rods 83 and 84 for moving the cutter across the face of the grinding wheel.

It will thus be seen that there is disclosed herein a novel and efficient form of universal tool grinding machine, which is well adapted for all the purposes indicated, even though there has been herein shown certain features of construction and operation of parts. It is nevertheless to be understood that various changes may be made therein without departing from the spirit or scope of the invention.

Having described my invention, what I claim as new and wish to secure by Letters Patent is:

1. A universal grinding machine comprising in combination, a support, a frame including guide bars adjustably mounted rotatably, vertically and horizontally on said support, a carriage slidably mounted on said guide bars, a work holder mounted on said carriage and adapted to rotatably support a work piece, rotary grinding means, adjustable means supporting said rotary grinding means, means for actuating said adjustable means for moving said rotary grinding means into engagement with the work piece, and means for actuating said adjustable means for moving said rotary grinding means along the work piece.

2. A universal grinding machine comprising in combination, a support, a frame adjustably mounted rotatably, vertically and horizontally on said support, a carriage slidably mounted on said frame, a work holder mounted on said carriage and adapted to rotatably support a work piece, rotary grinding means, means for actuating said rotary grinding means into engagement with the work piece, means for actuating said carriage on said frame for moving the work piece across said rotary grinding means, a rod mounted on said frame, and an adjustable stop mounted on said rod for limiting the sliding movement of said carriage on said frame.

3. A universal grinding machine comprising in combination, a support, a member mounted on said support, a frame adjustably mounted rotatably, vertically and horizontally on said member and including parallelly arranged guide bars, a carriage slidably mounted on said guide bars, a work holder mounted on said carriage and adapted to rotatably support, rotary grinding means, means for actuating said grinding means into engagement with the work piece, and means for actuating said grinding means along the work piece.

4. A universal grinding machine comprising in combination, a support, a standard adjustably mounted on said support, a member vertically adjustably mounted on said standard, a frame including a pair of parallelly arranged guide bars, said frame being rotatably adjustably mounted on said member, a carriage slidably mounted on said guide bars, a work holder mounted on said carriage and adapted to rotatably support a work piece, rotary grinding means, means for actuating said rotary grinding means into engagement with the work piece, means for actuating said carriage on said guide bars for moving the work piece across said rotary grinding means, a rod mounted on said frame, and an adjustable stop mounted on said rod for limiting the sliding movement of said carriage on said frame.

5. A universal grinding machine comprising in combination, a support, a standard adjustably mounted rotatably on said support, a member adjustably mounted vertically on said standard, rotatable means adapted to adjust said member on said standard, a frame including guide bars of unequal lengths, said frame rotatably mounted on said member, a carriage slidably mounted on said guide bars, a spindle rotatably mounted on said carriage and adapted to support a work piece, rotary grinding means, means for actuating said rotary grinding means into engagement with the work piece and means for actuating said grinding means along the work piece.

6. A universal grinding machine comprising in combination, a support, a standard adjustably mounted on said support, a member adjustably mounted horizontally and vertically on said standard, means including a shaft and operating handle adapted to adjust said member on said standard, a frame including guide bars rotatably mounted on said member, a carriage slidably mounted on said guide bars, a spindle mounted on said carriage and adapted to support a work piece, means on said carriage adapted to engage the work piece to hold it from being rotated in one direction, rotary grinding means, means adapted to actuate said rotary grinding means into engagement with the work piece, and means including an arm for actuating said carriage on said guide bars to actuate said spindle for actuating the work piece across said grinding means.

7. A universal grinding machine comprising in combination, a support, a member adjustably mounted horizontally and vertically on said support, a frame, said frame including guide bars and means supporting said guide bars in parallel relation, one of said guide bars rotatably adjustably mounted on said member, a carriage slidably mounted on said guide bars, a tool holder mounted on said carriage and adapted to rotatably support a cutting tool, rotary grinding means, means for actuating said rotary grinding means into engagement with the cutting tool, linkage means adapted to actuate said carriage on said guide bars for actuating said tool holder and moving the cutting tool across said grinding means, a rod mounted on said frame, and an adjustable stop mounted on said rod for limiting the sliding movement of said carriage on said guide bars.

8. A universal grinding machine comprising in combination, a support, a member horizontally and vertically adjustably mounted on said support, a frame, said frame including guide bars and transverse members holding said guide bars in spaced parallel relation, one of said guide bars rotatably adjustably mounted on said first mentioned member, a carriage slidably mounted on said guide bars, a tool holder mounted on said carriage and adapted to rotatably support a cutting tool, rotary grinding means, means adapted to actuate said rotary grinding means into engagement with the cutting tool, means adapted to move said grinding means longitudinally across the cutting tool, and means adapted to indicate the amount of adjustment of said frame for holding the cutting tool in a predetermined position relative to said grinding means.

9. A universal grinding machine comprising in combination, a base, a standard adjustably mounted on said base, and means adapted to indicate the amount of adjustment of said standard on said base, a member adjustably mounted vertically on said standard, means adapted to adjust said member on said standard, means adapted to indicate the amount of adjustment of said member on said standard, a frame adjustably mounted rotatably on said member, said frame including guide bars, a carriage slidably mounted on said guide bars, a tool holder rotatably mounted on said carriage and adapted to rotatably support a cutting tool, means engaging the cutting tool for holding it from being rotated in one direction, rotary grinding means, means for actuating said rotary grinding means into engagement with the cutting tool, means for actuating said carriage on said guide bars for moving said tool holder to actuate the cutting tool across said grinding means, and means adapted to indicate the amount of adjustment of said frame for holding the cutting tool in a predetermined position relative to said grinding means.

10. A universal grinding machine comprising in combination, a base, a motor support and a frame support adjustably mounted relative to each other on said base, a frame including guide bars adjustably mounted rotatably, vertically and horizontally on said frame support, a carriage slidably mounted on said frame, a work holder mounted on said carriage and adapted to rotatably support a work piece, said motor support including a platen adjustably mounted on said base, a motor rotatably mounted on said motor support, a grinding wheel mounted on a shaft of said motor, means for adjusting said motor support on said base, means for indicating the amount of adjustment of said motor support on said base, and means for actuating said motor support and motor toward said work holder to move said grinding wheel into engagement with the work piece.

11. A universal grinding machine comprising in combination, a base, a motor support and a frame support adjustably mounted relative to each other on said base, a member horizontally and vertically adjustably mounted on said frame support, a frame including guide bars rotatably adjustably mounted on said member, a carriage slidably mounted on said frame, a work holder rotatably mounted on said carriage and adapted to rotatably support a milling cutter, ratchet means adapted to engage the teeth of the milling cutter, said motor support including a platen and a supporting member, a motor adjustably mounted on said motor support, a grinding wheel mounted on a shaft of said motor, means for indicating the amount of adjustment of said motor on said motor support, means for actuating said motor support and motor toward the work holder for moving said grinding wheel into engagement with the teeth of the milling cutter, and means for actuating said motor support and motor for moving said grinding wheel across the teeth of the milling cutter.

12. A universal grinding machine comprising in combination, a support, a member adjustably mounted on said support, a frame including guide bars adjustably mounted on said member, spacing members holding said guide bars in a spaced parallel relation, a carriage slidably mounted on said guide bars, center holders mounted on said carriage and on one of said guide bars, centers mounted on said holders and adapted to rotatably support a cutting tool, means mounted on one of said spacing members and adapted to engage the cutting tool for holding it from being rotated in one direction, rotary grinding means, means for actuating said grinding means into engagement with the cutting tool and means for actuating said grinding means longitudinally along the cutting tool.

13. A universal grinding machine comprising in combination, a support, a member adjustably mounted on said support, a frame including guide bars adjustably mounted on said member, spacing members holding said guide bars in a spaced parallel relation, a carriage slidably mounted on said guide bars, center holders mounted on said carriage and on one of said guide bars, centers mounted on said holders and adapted to rotatably support a reamer, ratchet means pivotally connected to one of said spacing members and adapted to engage with the teeth of the reamer to hold the reamer from being rotated in one direction, rotary grinding means, means for actuating said rotary grinding means into engagement with teeth of the reamer and means for actuating said rotary grinding means longitudinally along the teeth of the reamer.

14. A universal grinding machine comprising in combination, a support, a member adjustably mounted on said support, a frame including spacing members adjustably mounted on said member, a carriage and arm adjustably mounted on said frame, center holders adjustably mounted on said carriage and arm, centers mounted on said holders and adapted to rotatably support a cutting tool, means mounted on one of said spacing members and adapted to engage the cutting tool to hold the cutting tool from being rotated in one direction, rotary grinding means, means for actuating said rotary grinding means into engagement with the cutting tool and means for actuating said grinding means longitudinally along the cutting tool.

15. A universal grinding machine comprising in combination, a support, a member adjustably mounted on said support, a frame including spacing members adjustably mounted on said member, a carriage and arm adjustably mounted on said frame, a center carrying spindle mounted on said carriage, a center holder having a center thereon adjustably mounted on said member, said centers adapted to rotatably support a pilot reamer, ratchet means pivotally connected to one of said spacing members, and adapted to engage with teeth of the pilot reamer for holding the pilot reamer from being rotated in one direction, rotary grinding means, means for actuating said rotary grinding means into engagement with the teeth of said pilot reamer and means for actuating said grinding means longitudinally along the teeth of said pilot reamer.

16. A universal grinding machine comprising in combination, a support, a carrier head adjustably mounted vertically on said support, a frame and a center holder adjustably mounted rotatably on said carrier head, a carriage adjustably mounted on said frame, a center holder mounted on said carriage, said carriage adapted to be actuated on said frame for moving the center holder thereon toward or away from said center holder on said carrier head, centers mounted on said holders and adapted to rotatably support a milling cutter, a tooth rest including an adjustably mounted tongue adapted to engage with teeth of the milling cutter, rotary grinding means, means for actuating said rotary grinding means into engagement with the teeth of the milling cutter and means for actuating said grinding means longitudinally along the teeth of the milling cutter.

17. A universal grinding machine comprising in combination, a support, a carrier head adjustably mounted vertically on said support, a frame and a center holder adjustably mounted rotatably on the carrier head, a carriage adjustably mounted on said frame, a center holder mounted on said carriage, said carriage adapted to be actuated on said frame for moving the center holder thereon toward or away from said center holder on said carrier head, centers mounted on said holders and adapted to rotatably support a spiral milling cutter, a motor support having a bracket secured thereto, a motor rotatably mounted on said motor support, a grinding wheel mounted on a shaft of said motor, a tooth rest including a tongue supporting member adjustably mounted on said bracket, and a tongue adjustably mounted on said tongue supporting member, said tongue adapted to engage with teeth on the milling cutter, means for actuating said motor support for moving said grinding wheel into engagement with the teeth of said milling cutter, and means for actuating said motor support for moving said grinding wheel longitudinally on the teeth of said milling cutter.

18. A universal grinding machine comprising in combination, a support, a carrier head adjustably mounted vertically on said support, a frame and a center holder adjustably mounted rotatably on said carrier head, a carriage adjustably mounted on said frame, a center holder mounted on said carriage, said carriage adapted to be actuated on said frame for moving the center holder thereon toward and away from the center holder on said carrier head, centers mounted on said holders and adapted to rotatably support a spiral slab milling cutter, a motor support having a bracket secured thereto, a motor rotatably mounted on said motor support, a grinding wheel mounted on a shaft of said motor, a tooth rest including a tongue supporting member adjustably mounted on said bracket, a guide portion hingedly connected to said tongue supporting member, a tongue adjustably mounted on said guide portion, said tongue having a forked end spirally formed and engaging the teeth of the milling cutter, means for actuating said motor support for moving the grinding wheel on said motor into engagement with the teeth of said milling cutter and means for actuating said motor support for moving said grinding wheel longitudinally on the teeth of said milling cutter.

19. A universal grinding machine comprising in combination, a support, a frame adjustably mounted rotatably, vertically and horizontally on said support, a carriage slidably mounted on said frame, a tool holder support rotatably mounted on said carriage, a tool holder mounted on said tool holder support and at a right angle thereto, said tool holder adapted to rotatably support a straddle milling cutter, means on said tool holder support engaging teeth of the milling cutter for holding it from being rotated in one direction, rotary grinding means, means for actuating said grinding means into engagement with the milling cutter, means for rotating said tool holder support for rotating said tool holder therewith for moving the milling cutter to a predetermined position relative to said rotary grinding means, and means for rotating said tool holder for actuating the milling cutter, whereby the teeth on the milling cutter may be brought in succession into engagement with said grinding means.

ERNEST HENRY WEIDMANN.